United States Patent
Gu

(10) Patent No.: US 9,030,141 B2
(45) Date of Patent: May 12, 2015

(54) MOTOR CONTROLLING CIRCUIT, MOTOR DRIVING DEVICE AND METHOD OF DRIVING MOTOR

(71) Applicant: Samsung Electro-Mechanics Co., Ltd., Suwon (KR)

(72) Inventor: Bon Young Gu, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 225 days.

(21) Appl. No.: 13/712,010

(22) Filed: Dec. 12, 2012

(65) Prior Publication Data

US 2014/0028229 A1    Jan. 30, 2014

(30) Foreign Application Priority Data

Jul. 24, 2012 (KR) .......................... 10-2012-0080762

(51) Int. Cl.
*H02P 7/00* (2006.01)
*H02P 6/16* (2006.01)

(52) U.S. Cl.
CPC . *H02P 7/00* (2013.01); *H02P 6/165* (2013.01)

(58) Field of Classification Search
CPC ....................................................... H02P 7/00
USPC ............. 318/400.01, 400.07, 400.38, 400.39, 318/400.4, 400.14, 400.15, 721, 799, 779, 318/280, 266, 466, 430, 432, 652, 801; 388/800, 806, 911, 909
See application file for complete search history.

(56) References Cited

U.S. PATENT DOCUMENTS

| | | | |
|---|---|---|---|
| 7,259,531 B1 * | 8/2007 | Liu | 318/400.38 |
| 8,159,171 B2 * | 4/2012 | Cheng | 318/599 |
| 2004/0155618 A1 | 8/2004 | Yamamoto | |
| 2007/0092232 A1 | 4/2007 | Fujii | |
| 2010/0097020 A1 | 4/2010 | Kiyamura et al. | |

FOREIGN PATENT DOCUMENTS

| | | |
|---|---|---|
| JP | 2005-311521 | 11/2005 |
| JP | 2007-116858 | 5/2007 |
| JP | 2009-136125 | 6/2009 |
| JP | 2010-98922 | 4/2010 |
| JP | 2010-104149 | 5/2010 |
| JP | 2012-23880 | 2/2012 |
| KR | 0172221 | 10/1998 |
| KR | 10-2004-0071623 | 8/2004 |

OTHER PUBLICATIONS

Korean Office Action mailed Nov. 19, 2013 in corresponding Korean Patent Application No. 10-2012-0080762.
Japanese Office Action issued on Oct. 22, 2013 in corresponding Japanese Patent Application No. 2012-221044.

* cited by examiner

*Primary Examiner* — Antony M Paul

(57) ABSTRACT

There is provided a motor controlling circuit including: a hall signal level detecting unit detecting a hall signal from a hall sensor; and a signal generating unit sensing a change in a level of the hall signal to generate a motor controlling signal according to the change in the level of the hall signal, wherein the signal generating unit determines that the hall signal is maintained at a high level in a case in which a high level maintaining time of the hall signal is equal to or shorter than a preset time.

8 Claims, 4 Drawing Sheets

MOTOR CONTROLLING CIRCUIT, MOTOR DRIVING DEVICE AND METHOD OF DRIVING MOTOR

CROSS-REFERENCE TO RELATED APPLICATIONS

This application claims the priority of Korean Patent Application No. 10-2012-0080762 filed on Jul. 24, 2012, in the Korean Intellectual Property Office, the disclosure of which is incorporated herein by reference.

BACKGROUND OF THE INVENTION

1. Field of the Invention

The present invention relates to a motor controlling circuit, a motor driving device, and a method of driving a motor.

2. Description of the Related Art

A brushless direct current (BLDC) motor generally refers to a DC motor in which a function of conducting current or adjusting a current direction is adjusted by using a non-contact position detector and a semiconductor device rather than using a mechanical contact such as a brush, a commutator, or the like, in the DC motor.

Generally, a speed of a motor, of which a speed is controllable, may be controlled by adjusting a duty value of a pulse width modulation (PWM) signal. The duty value of the pulse width modulation signal may be determined according to a ratio between a turn-on time at which the signal has a high value in a single signal period and a turn-off time at which the signal has a low value in a single signal period, and a rotational speed of the motor may be in proportion to the duty value of the pulse width modulation signal.

In the case of the BLDC motor, the rotation of the motor is controlled according to a hall signal of which a level is changed according to polarity, and motor controlling signals are generated by detecting a falling edge at which the level of the hall signal is changed from high to low and a rising edge at which the level of the hall signal is changed from low to high.

Since driving of the motor is controlled according to the hall signal, in the case in which noise is generated in the hall signal, erroneous motor controlling signals may be generated, such that the motor may rotate in reverse.

In addition, in the case in which the level of the hall signal rises from low to high, impulse signals may be generated several times until the hall signal has a stabilized high level. Here, in controlling the driving of the motor, in the case in which the motor controlling signals are generated by detecting both of the rising and falling edges of each impulse signal generated before a high level is stabilized, motor driving efficiency may be deteriorated.

RELATED ART DOCUMENT

Japanese Patent Laid-Open Publication No. 2012-23880
Korean Patent Laid-Open Publication No. 2004-0071623

SUMMARY OF THE INVENTION

An aspect of the present invention provides a motor controlling circuit, a motor driving device, and a method of driving a motor, capable of efficiently generating motor controlling signals by comparing impulse signals generated until a changed level of a hall signal is stabilized at the time of a change in a level of the hall signal with a preset time.

Another aspect of the present invention provides a motor controlling circuit, a motor driving device, and a method of driving a motor, capable of preventing a motor from rotating in reverse by determining that a signal generated during a process of stabilizing a hall signal is an impulse signal or a noise signal.

According to an aspect of the present invention, there is provided a motor controlling circuit including: a hall signal level detecting unit detecting a hall signal from a hall sensor; and a signal generating unit sensing a change in a level of the hall signal to generate a motor controlling signal according to the change in the level of the hall signal, wherein the signal generating unit determines that the hall signal is maintained at a high level in a case in which a high level maintaining time of the hall signal is equal to or shorter than a preset time.

The preset time may be set from a frequency detected when a motor rotates at maximum speed.

The motor controlling circuit may further include a comparing unit transferring a comparison value generated by comparing the motor controlling signal output from the signal generating unit and a reference signal to the signal generating unit.

The comparison unit may output the comparison value so that the motor controlling signal is initialized in the case in which the motor controlling signal output from the signal generating unit and the reference signal are different from one another.

According to another aspect of the present invention, there is provided a motor driving device including: a motor driving unit; a hall signal level detecting unit detecting a hall signal generated by sensing a polarity of a motor from a hall sensor included in the motor driving unit; and a signal generating unit generating a motor controlling signal according to a change in a level of the hall signal output from the hall signal level detecting unit, wherein the signal generating unit determines that the hall signal is maintained at a high level in a case in which a high level maintaining time of the hall signal is equal to or shorter than a preset time.

The preset time may be set according to a period of the hall signal detected when the motor rotates at maximum speed.

The motor driving device may further include a comparing unit comparing the motor controlling signal output from the signal generating unit and a reference signal and transferring a comparison result to the signal generating unit, wherein the comparison unit outputs a comparison value so that the motor controlling signal is initialized in the case in which the motor controlling signal output from the signal generating unit and the reference signal are different from one another.

According to another aspect of the present invention, there is provided a method of driving a motor, the method including: detecting a hall signal from a hall sensor; sensing a change in a level of the hall signal to generate a motor controlling signal and determining that the hall signal is maintained at a high level in a case in which a high level maintaining time of the hall signal is equal to or shorter than a preset time, to thus generate the motor controlling signal; and driving the motor according to the motor controlling signal.

The preset time may be set according to a period of the hall signal detected when the motor rotates at maximum speed.

The method may further include comparing the motor controlling signal and a reference signal and initializing the motor controlling signal in the case in which the motor controlling signal and the reference signal are different from one another.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
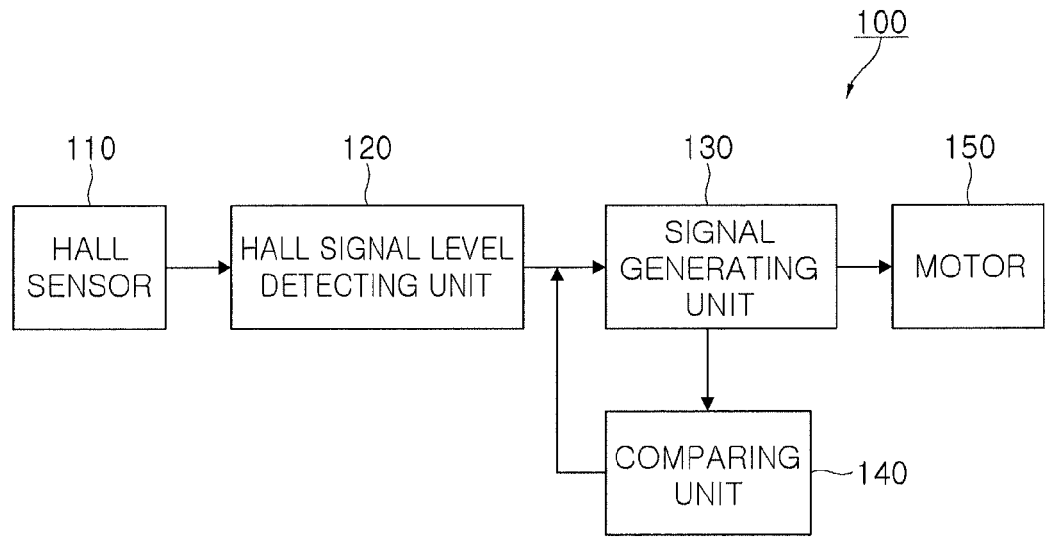
FIG. 1 is a block diagram schematically illustrating a motor controlling circuit according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Hereinafter, embodiments of the present invention will be described in detail with reference to the accompanying drawings so that those skilled in the art may easily practice the present invention.

FIG. 1 is a block diagram schematically illustrating a motor controlling circuit 100 according to an embodiment of the present invention.

Referring to FIG. 1, the motor controlling circuit 100 according to the present embodiment may include a hall signal level detecting unit 120, a signal generating unit 130, and a comparing unit 140.

An operation of a motor may be controlled according to a motor controlling signal output from the signal generating unit 130, wherein the motor controlling signal is generated according to a hall signal output from the hall signal level detecting unit 120. The motor controlling signal and the hall signal may be pulse width modulation (PWM) signals having a high value and a low value, and a level of the motor controlling signal may be changed by detecting an edge at which a level of the hall signal rises from low to high or falls from high to low. That is, the signal generating unit 130 may change the level of the motor controlling signal that has been low to be high and the level of the motor controlling signal that has been high to be low, and may then output the motor controlling signal, at the time of detecting the rising or falling edge in the hall signal.

The hall signal level detecting unit 120 may be a circuit outputting the hall signal, which may be a signal sensed from a hall sensor 110 included in a motor driving device. The hall sensor 110 may determine a polarity of the motor to generate the hall signal. That is, whenever the polarity of the motor sensed by the hall sensor 110 is changed, in the case in which the level of the hall signal is high, the level of the hall signal may be changed to be low, and in the case in which the level of the hall signal is low, the level of the hall signal may be changed to be high.

The comparing unit 140 may receive the motor controlling signal output from the signal generating unit 130 and compare the received motor controlling signal with a reference signal. The reference signal, an arbitrarily set value, may become a reference signal for comparing whether the motor controlling signal is affected by noise introduced into the hall signal. That is, in the case in which the motor controlling signal is the same as the reference signal, it may be determined that the motor is operating normally, and in the case in which the motor controlling signal is different from the reference signal, it may be determined that the motor is affected by noise, such that the motor controlling signal may be initialized. The signal generating unit 130 and the comparing unit 140 may be connected to each other to configure a feedback circuit.

The motor controlling signal configured by feedback of the signal generating unit 130 and the comparing unit 140 may be transmitted to the motor driving device to control the driving of the motor.

Figure 2:
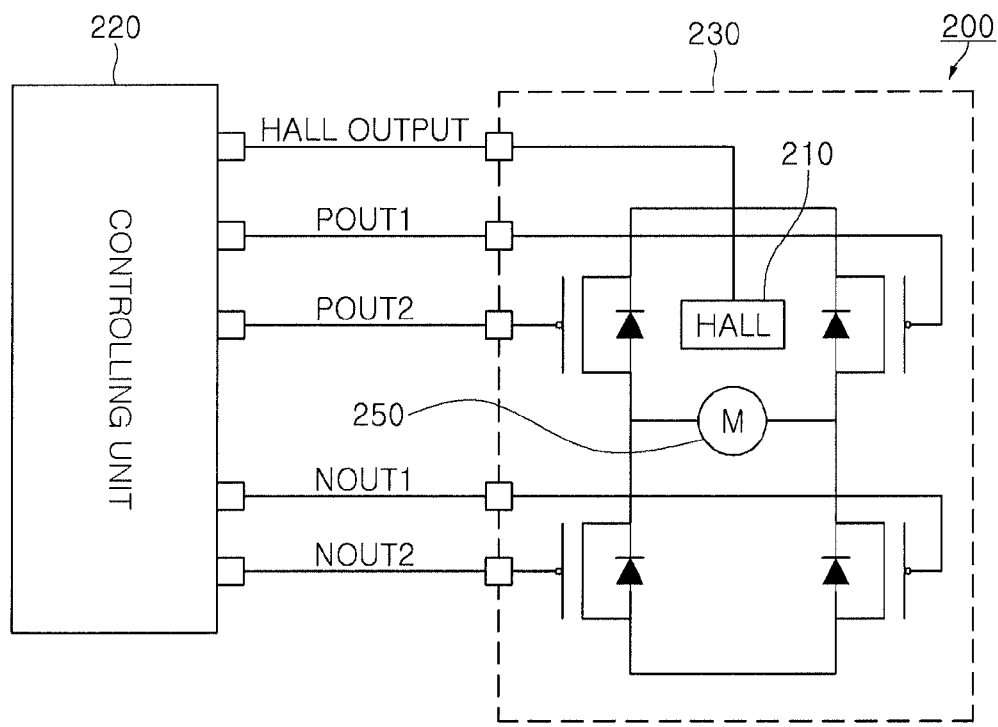
FIG. 2 is a diagram schematically illustrating a motor driving device according to the embodiment of the present invention.

FIG. 2 is a diagram schematically illustrating a motor driving device 200 according to the embodiment of the present invention.

Referring to FIG. 2, the motor driving device 200 may include a controlling unit 220 and a field effect transistor (FET) driving unit 230. The controlling unit 220, which includes the motor controlling circuit, may receive a hall signal HALL OUTPUT output from the FET driving unit 230 and output motor controlling signals POUT1, POUT2, NOUT1, and NOUT2 driving the motor. That is, the controlling unit 220 may include all of the hall signal level detecting unit 120, the signal generating unit 130, and the comparing unit 140.

The driving unit 230 may include a total of four switches, wherein the four switches may be configured of two P-channel metal oxide semiconductor field effect transistors (PMOS FETs) and two N-channel metal oxide semiconductor field effect transistors (NMOS FETs).

A first PMOS FET to which the motor controlling signal POUT1 is supplied may be electrically connected between a power supplying terminal supplying power and a ground, and a first NMOS FET to which the motor controlling signal NOUT1 is supplied may be electrically connected between the first PMOS FET and the ground.

A second PMOS FET to which the motor controlling signal POUT2 is supplied may be connected to the power supplying terminal in parallel with the first PMOS FET, and may be electrically connected between the power supplying terminal and the ground, and a second NMOS FET to which the motor controlling signal NOUT2 is supplied may be electrically connected between the second PMOS FET and the ground.

The FET driving unit 230 may receive the motor controlling signals POUT1, POUT2, NOUT1, and NOUT2 of the controlling unit 220 to turn four field effect transistors (FETs) on or off, thereby driving the motor. Four motor controlling signals POUT1, POUT2, NOUT1, and NOUT2 may be required in order to turn four FETs on or off.

The motor may be driven by turning the motor controlling signals POUT1 and NOUT2 on and turning the motor controlling signals POUT2 and NOUT1 off, or turning the motor controlling signals POUT1 and NOUT2 off and turning the motor controlling signals POUT2 and NOUT1 on.

The motor controlling signals POUT1, POUT2, NOUT1, and NOUT2, signals generated by the hall signal, may be generated so that the level of the motor controlling signal that has been low rises to be high and the level of the motor controlling signal that has been high falls to be low at the time of detection of the rising edge or the falling edge in the hall signal.

The hall signal HALL OUTPUT may be a signal generated by a polarity of the motor 250 sensed by the hall sensor 210, wherein the polarity of the motor 250 sensed by the hall sensor 210 may be continuously changed from an N pole to an S pole or from the S pole to the N pole according to rotation of the motor 250. Whenever the polarity of the motor 250 sensed by the hall sensor 210 is changed, in the case in which the level of the hall signal HALL OUTPUT is high, the level of the hall signal HALL OUTPUT may be changed to be low, and in the case in which the level of the hall signal HALL OUTPUT is low, the level of the hall signal HALL OUTPUT may be changed to be high.

Figure 3:
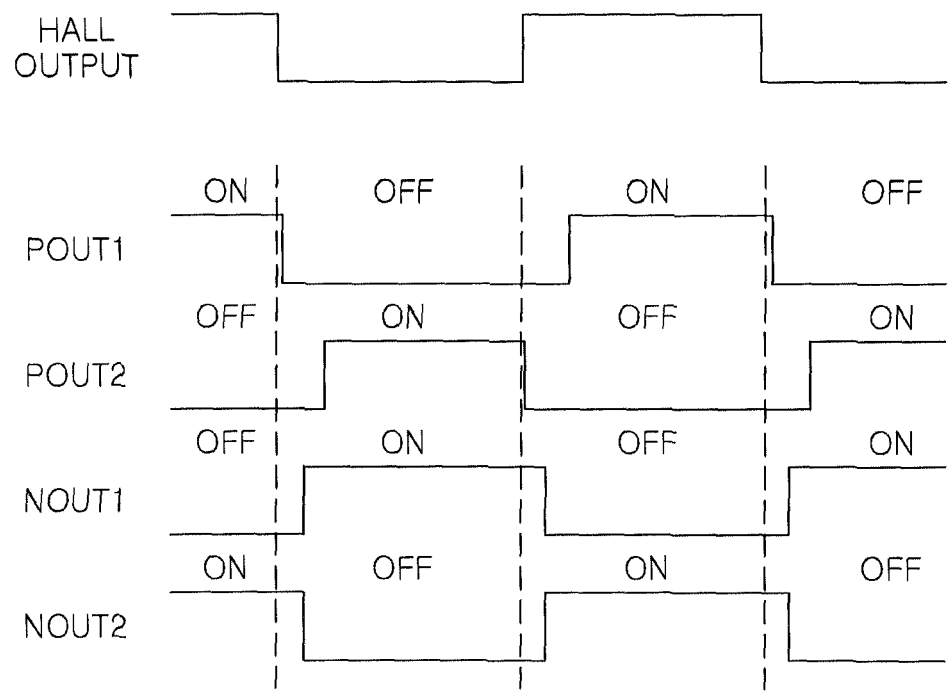
FIGS. 3 through 5 are graphs provided in order to describe a method of driving a motor according to the embodiment of the present invention.
Figure 4:
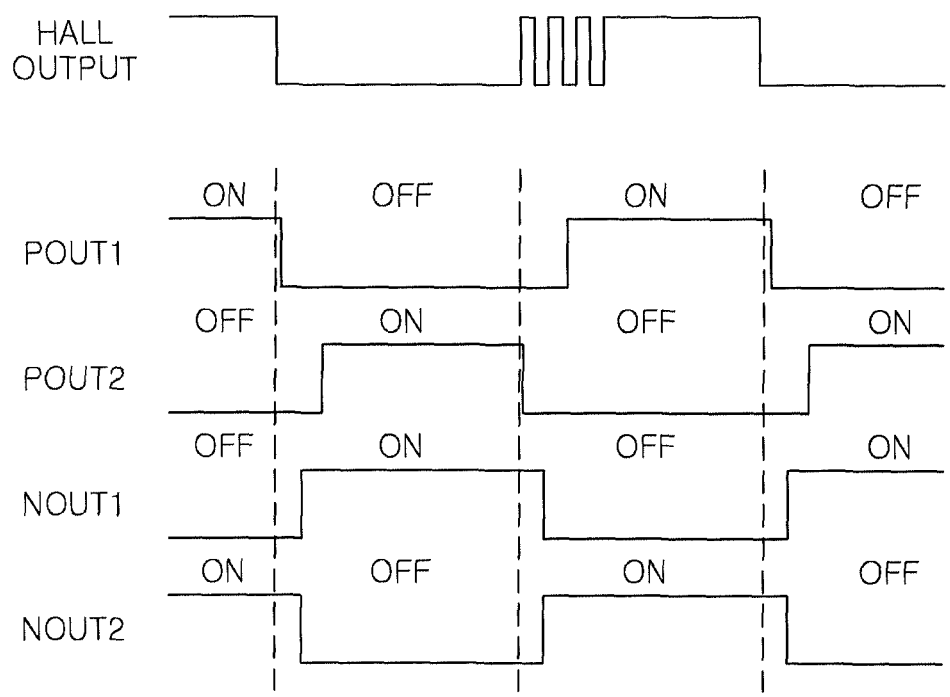

FIGS. 3 and 4 are graphs illustrating a hall signal HALL OUTPUT and motor controlling signals POUT1, POUT2, NOUT1, and NOUT2 according to the embodiment of the present invention.

Referring to FIG. 3, the hall signal HALL OUTPUT may be a square wave signal having a high level and a low level. The high level and the low level of the hall signal HALL OUTPUT may be periodically repeated, and the level of the hall signal HALL OUTPUT may rise or fall whenever the polarity of the motor sensed by the hall sensor is changed.

For example, when the polarity of the motor sensed by the hall sensor is an N pole at the time at which motor driving is initiated from a stopped state and the level of the hall signal HALL OUTPUT is high, in the case in which the polarity of the motor sensed by the hall sensor has S polarity due to the rotation of the motor, the hall sensor senses a change in the polarity, such that the level of the hall signal HALL OUTPUT falls from high to low. Again, in the case in which the polarity of the motor sensed by the hall sensor has N polarity due to the rotation of the motor, the hall sensor senses a change in the polarity, such that the level of the hall signal HALL OUTPUT rises from low to high. The above-mentioned operation is repeated, such that the hall signal HALL OUTPUT may be generated.

The motor controlling signals POUT1, POUT2, NOUT1, and NOUT2 may be square wave signals having a high level and a low level generated according to the hall signal HALL OUTPUT. For example, when the level of the hall signal HALL OUTPUT is high at the time at which motor driving is initiated from the stopped state, the levels of POUT1 and NOUT2 are high, and the levels of POUT2 and NOUT1 are low; in the case in which the level of the hall signal falls from high to low due to the change in the polarity, the levels of POUT1 and NOUT2 that have been high may fall to low and the levels of POUT2 and NOUT1 that have been low may rise to high. After the hall signal HALL OUTPUT and the motor controlling signals POUT1, POUT2, NOUT1, and NOUT2 are maintained at the changed levels, when the level of the hall signal again rises from low to high due to the change in the polarity, the levels of POUT1 and NOUT2 that have been low may rise to high and the levels of POUT2 and NOUT1 that have been high may fall to low.

That is, in the ideal case in which noise is not introduced into the hall signal, the high level, the low level, the high level, and the low level of the hall signal may be sequentially repeated. Therefore, the levels of the motor controlling signals POUT1 and NOUT2 may be changed so as to be the same as that of the hall signal, and the levels of the motor controlling signals POUT2 and NOUT1 may be changed to be opposite to that of the hall signal.

It may be seen from FIG. 4 that in the case in which the level of the hall signal HALL OUTPUT rises from low to high due to the change in the polarity, impulse signals having a relatively significantly short high-level maintaining time are repeated several times until the hall signal is maintained at a stabilized high level.

Here, in the case in which the motor controlling signals POUT1, POUT2, NOUT1, and NOUT2 are generated by detecting all of the rising and falling changes of the impulse signals, efficiency of the motor may be deteriorated. That is, in the case in which the impulse signals are generated three times until the hall signal is stably maintained at the high level as in the hall signal HALL OUTPUT of FIG. 4, the level of the motor controlling signal may be changed six times.

According to the embodiment of the present invention, the high level maintaining time of the hall signal is compared with a preset time, it is determined that the hall signal is maintained at the high level even in a case in which the level of the hall signal falls in the case in which the high level maintaining time of the hall signal is shorter than the preset time, whereby the motor controlling signal may be generated. That is, when the level of the hall signal rises from low to high, a change in the level of the impulse signal generated until the hall signal is maintained at the high level may be ignored.

A time that becomes a reference for which the change in the level of the hall signal is sensed to change the levels of the motor controlling signals POUT1, POUT2, NOUT1, and NOUT2 or during which it is determined that the level of the hall signal has not changed even in a case in which the level of the hall signal is changed, may be determined according to a relative maximum speed of the motor. A period of the hall signal, determined by a speed of the motor, may be shortest when the motor rotates at a maximum speed thereof. The period of the hall signal may be determined by a time required for the motor to complete a single rotation when the motor rotates at maximum speed.

For example, in the case of a brushless direct current (BLDC) motor including four FETs for controlling the motor, the period of the hall signal may be repeated twice during a time in which the motor completes a single rotation. In this case, when it is assumed that the maximum speed of the motor is 1000 rpm, a time required for the motor to rotate once may be 6.0 ms and a time for which the hall signal is maintained at the high level or the low level may be about 1.5 ms at most. That is, when the time for which the hall signal is maintained at the high level is equal to or smaller than 1.5 ms, it is determined that the impulse signals are generated, such that it is determined that the hall signal is maintained at the high level even in a case in which the change is generated in the level of the hall signal, whereby the motor controlling signal may be generated.

As shown in FIG. 4, in the case in which the impulse signals are generated before the hall signal is stably maintained at the changed level when the level of the hall signal is changed due to the change in the polarity, the motor controlling signal is not generated by sensing the change in the level of all of the impulse signals, but may be output according to a polarity changed at the time of generation of a first impulse signal.

Comparing FIGS. 3 and 4 with each other, the high level maintaining time of the hall signal is sensed, whereby even in the case that an unnecessary impulse signal is introduced into the hall signal, the same signal as the motor controlling signal in the case in which the impulse signal is not generated may be output. Therefore, driving efficiency of the motor may be improved.

Figure 5:
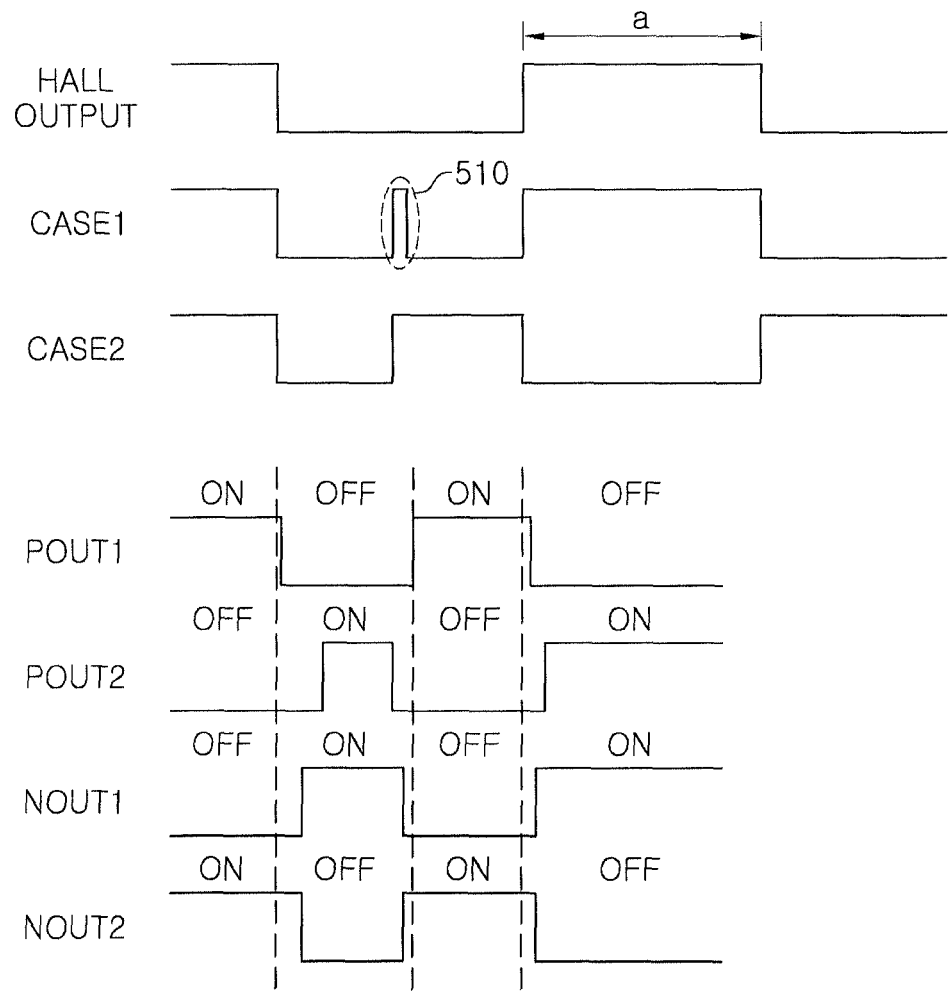

FIG. 5 is a graph illustrating a hall signal and motor controlling signals according to the embodiment of the present invention. As described above, the high level maintaining time of the hall signal and the preset time are compared to determine whether the impulse single is generated, and it is determined that the hall signal is maintained at the high level even when the level of the hall signal falls in the case in which it is determined that the impulse signal is generated, whereby the motor controlling signal may be efficiently generated. However, in the case in which the impulse signal is a noise signal rather than a signal generated during a process of stabilizing the changed hall signal, a motor controlling signal causing reverse rotation of the motor may be generated.

Therefore, the motor controlling circuit 100 according to the embodiment of the present invention may include the comparing unit comparing the motor controlling signal with the reference signal. The reference signal indicates a level of a hall signal in the ideal case in which the impulse signal is applied to the hall signal, and motor controlling signals according to the level of the hall signal, as shown in FIG. 3. For example, in the reference signal, when the level of the hall signal is high, the levels of the motor controlling signals POUT1 and NOUT2 may be high and the levels of the motor controlling signals POUT2 and NOUT1 may be low, and when the level of the hall signal is low, the levels of the motor controlling signals POUT1 and NOUT2 may be low and the levels of the motor controlling signals POUT2 and NOUT1 may be high.

As shown in CASE 1 of FIG. 5, in the case in which a noise signal is generated during a time at which the hall signal is maintained at the low level, it is determined that the noise signal is the impulse signal, such that it may be determined that the hall signal is maintained at the high level even in the case that the level of the hall signal falls from high to low.

The level of the hall signal may rise from low to high in a section in which the hall signal needs to be maintained at the low level due to the impulse signal and may fall from high to low in a section in which the level of the hall signal needs to rise due to an actual change in polarity. That is, although the hall signal according to the change in the polarity sensed by the hall sensor needs to be the same as HALL OUTPUT, the hall signal may be determined as shown in CASE 2.

An actual motor driving control needs to be based on the motor controlling signal generated according to HALL OUTPUT. However, when the impulse signal is introduced as the noise signal, the motor controlling signal may be generated based on a signal as shown in CASE 2 of FIG. 5.

In this case, in a section a, the motor controlling signal and the reference signal may be compared with each other. It may be determined that in the case in which the motor controlling signal is generated according to HALL OUTPUT, the motor controlling signal and the reference signal have the same level as each other; however, in the case in which the motor controlling signal is generated according to CASE 2, the motor controlling signal and the reference signal have levels opposite to each other.

In the case in which it is determined by the comparing unit that the reference signal and the motor controlling signal are different from one another, the signal generating unit may initialize the motor controlling signal.

Hereinafter, a method of driving a motor according to the embodiment of the present invention will be sequentially described.

Figure 6:
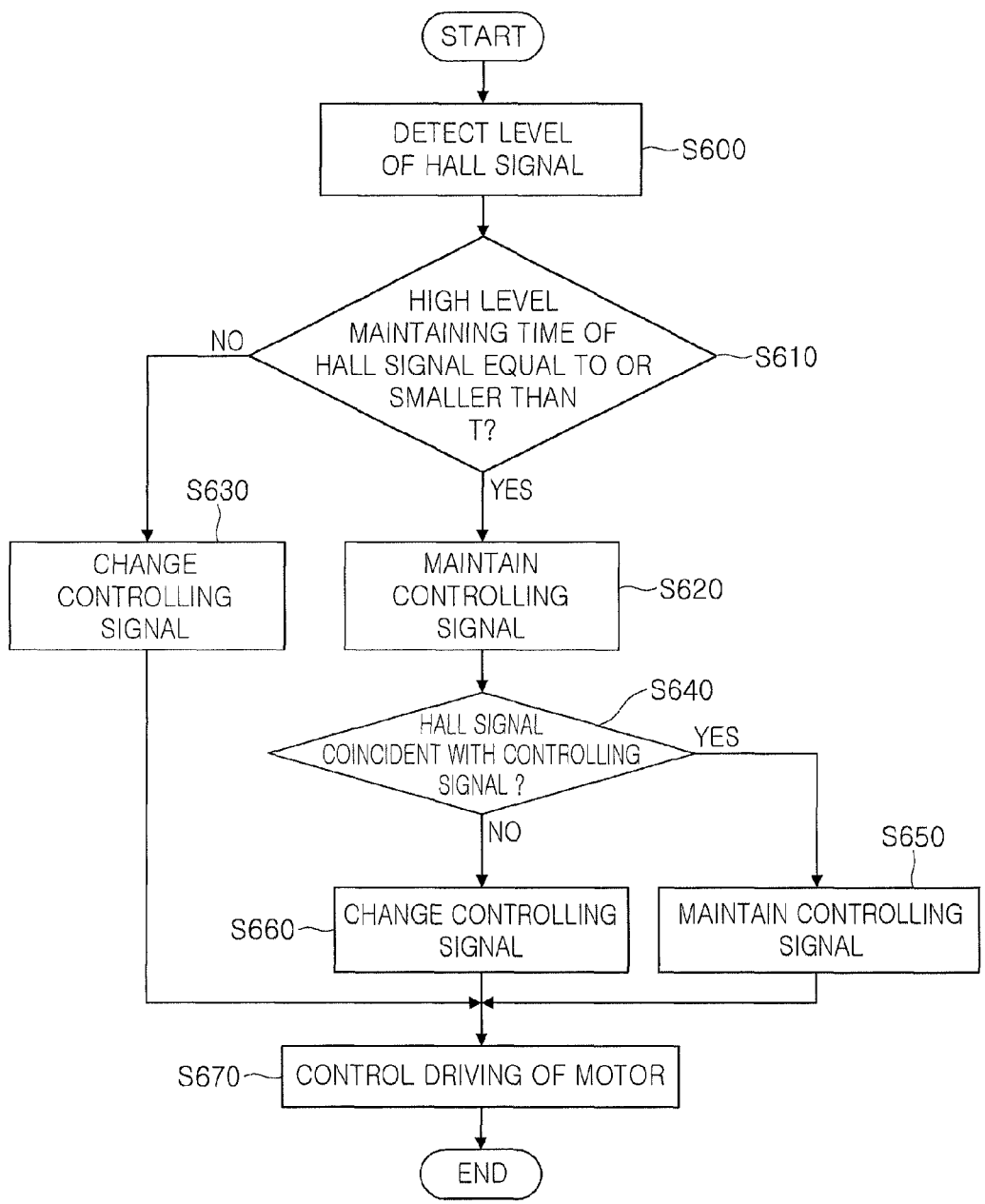
FIG. 6 is a flow chart provided in order to describe the method of driving a motor according to the embodiment of the present invention.

FIG. 6 is a flow chart provided in order to describe the method of driving a motor according to the embodiment of the present invention.

First, a hall signal of which a level is changed according to a change in a polarity sensed by the hall sensor is generated. The change in the level of the hall signal is detected through a motor controlling signal controlling driving of the motor (S600), and a level of the motor controlling signal is changed at the time of detection of the change in the level of the hall signal (S630). In this case, when a high level maintaining time of the hall signal is equal to or shorter than a preset time, it is determined that the motor controlling signal is maintained at a high level even in the case that the level of the hall signal falls, whereby the level of the motor controlling signal may be maintained (S620).

However, in the case in which the high level maintaining time of the hall signal is equal to or smaller than the preset time but a noise signal is introduced, in order to prevent a motor from rotating in reverse, the motor controlling signal and a reference signal may be compared and the motor controlling signal may be initialized so as to be the same as the reference signal in the case in which the motor controlling signal and the reference signal are different from one another (S650 and S660).

That is, according to the embodiment of the present invention, the impulse signal generated until the changed level of the hall signal is stabilized at the time of the change in the level of the hall signal is detected, whereby the motor controlling signal may be efficiently generated, and the motor controlling signal and the reference signal are compared with each other, whereby even in the case that the motor controlling signal is generated in reverse due to the introduction of the impulse signal as noise, the motor controlling signal that is the same as the reference signal may be generated due to feedback. The motor controlling signal generated through the above-mentioned processes may be applied to the driving unit to drive the motor (S670).

As set forth above, according to the embodiments of the present invention, the impulse signals generated until a changed level of a hall signal is stabilized at the time of the change in the level of the hall signal is compared with a preset time to thus efficiently generate the motor controlling signal, and further, reverse rotation of the motor may be prevented by determining whether a signal generated during a process of stabilizing a hall signal is the impulse signal or the noise signal.

While the present invention has been shown and described in connection with the embodiments, it will be apparent to those skilled in the art that modifications and variations can be made without departing from the spirit and scope of the invention as defined by the appended claims.

What is claimed is:

1. A motor controlling circuit comprising:
   a hall signal level detecting unit detecting a hall signal from a hall sensor;
   a signal generating unit sensing a change in a level of the hall signal to generate a motor controlling signal according to the change in the level of the hall signal; and
   a comparing unit transferring a comparison value generated by comparing the motor controlling signal output from the signal generating unit and a reference signal to the signal generating unit,
   wherein the signal generating unit determines that the hall signal is maintained at a high level in a case in which a high level maintaining time of the hall signal is equal to or shorter than a preset time.

2. The motor controlling circuit of claim 1, wherein the preset time is set from a frequency detected when a motor rotates at maximum speed.

3. The motor controlling circuit of claim 1, wherein the comparison unit outputs the comparison value so that the motor controlling signal is initialized in the case in which the motor controlling signal output from the signal generating unit and the reference signal are different from one another.

4. A motor driving device comprising:
a motor driving unit;
a hall signal level detecting unit detecting a hall signal generated by sensing a polarity of a motor from a hall sensor included in the motor driving unit;
a signal generating unit generating a motor controlling signal according to a change in a level of the hall signal output from the hall signal level detecting unit; and
a comparing unit comparing the motor controlling signal output from the signal generating unit and a reference signal and transferring a comparison result to the signal generating unit,
wherein the signal generating unit determines that the hall signal is maintained at a high level in a case in which a high level maintaining time of the hall signal is equal to or shorter than a preset time.

5. The motor driving device of claim 4, wherein the preset time is set according to a period of the hall signal detected when the motor rotates at maximum speed.

6. The motor driving device of claim 4,
wherein the comparison unit outputs a comparison value so that the motor controlling signal is initialized in the case in which the motor controlling signal output from the signal generating unit and the reference signal are different from one another.

7. A method of driving a motor, the method comprising:
detecting a hall signal from a hall sensor;
sensing a change in a level of the hall signal to generate a motor controlling signal, and determining that the hall signal is maintained at a high level in a case in which a high level maintaining time of the hall signal is equal to or shorter than a preset time, to thus generate the motor controlling signal;
comparing the motor controlling signal and a reference signal and initializing the motor controlling signal in the case in which the motor controlling signal and the reference signal are different from one another; and
driving the motor according to the motor controlling signal.

8. The method of claim 7, wherein the preset time is set according to a period of the hall signal detected when the motor rotates at maximum speed.

* * * * *